J. AMBICKY
FILE OR RASP.
APPLICATION FILED SEPT. 23, 1915.
1,170,950.
Patented Feb. 8, 1916.
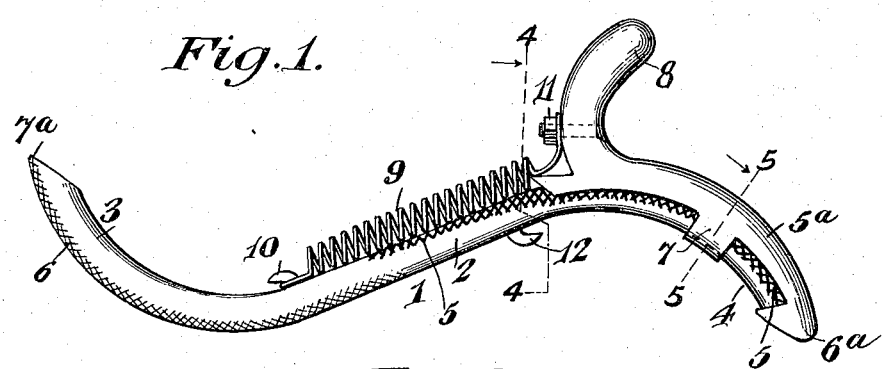
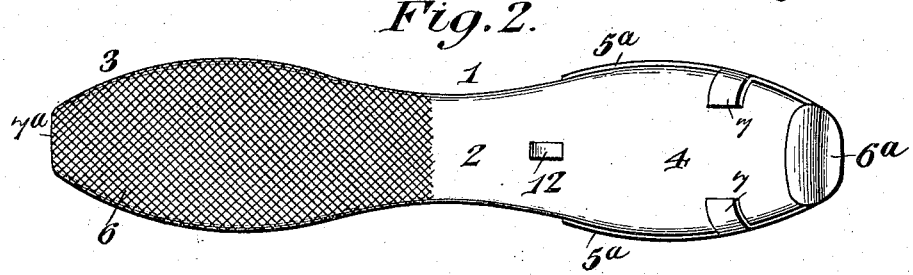
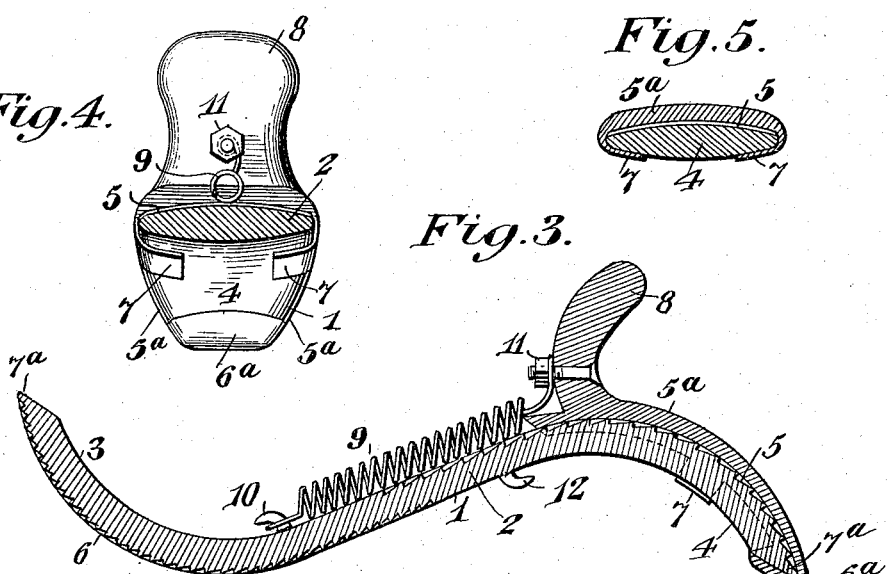
WITNESSES:
Jas. K. McCathran
Jos. H. Blackwood
John Ambicky, INVENTOR
BY
Attorney

UNITED STATES PATENT OFFICE.

JOHN AMBICKY, OF PERTH AMBOY, NEW JERSEY.

FILE OR RASP.

1,170,950.  Specification of Letters Patent.  Patented Feb. 8, 1916.

Application filed September 23, 1915. Serial No. 52,252.

*To all whom it may concern:*

Be it known that I, JOHN AMBICKY, a subject of the Emperor of Austria-Hungary, residing at Perth Amboy, in the county of Middlesex and State of New Jersey, have invented a new and useful File or Rasp, of which the following is a specification.

This invention has reference to a file or rasp more especially for use in the trade of horse-shoeing, and has for its object to provide a file or rasp which is adapted to thoroughly clean all the portions of the hoof between the frog and crust, and which will possess many advantages over the devices now in use.

The invention consists of a double ended file having the general shape of the letter S, with a removable handle adapted to be fastened to and fit either end alike, and means for removably securing the handle in place.

In the drawings:—Figure 1 is a side elevation of a file or rasp embodying my invention. Fig. 2 is a bottom plan view. Fig. 3 is a central longitudinal vertical section, partly in elevation. Fig. 4 is a transverse section taken on the line 4—4 of Fig. 1. Fig. 5 is a transverse section taken on the line 5—5 of Fig. 1.

Referring to the drawings, there is shown a file or rasp 1, having the shape of the letter S, being provided with a substantially straight middle portion 2, and reversely curved ends 3 and 4 covered with file teeth 5 and 6 on the oppositely curved faces of the ends 3 and 4 respectively, the teeth on the surface of the end 3 being fine, while the teeth on the surface of the end 4 are coarse, thus providing a plurality of abrading surfaces.

A longitudinally and transversely curved handle $5^a$, curved to correspond with the contour of the ends 3 and 4 of the file, is provided, having a socket $6^a$ at its lower end adapted to receive the extreme end $7^a$ of the file, and depending lugs 7, on each side, which embrace the sides and under surface of the file. A curved finger or arm 8, is provided on the end of the handle opposite the socket 6, and a coiled spring 9 secures the handle 5 to the file, said spring being connected at one end to a hook or curved lug 10 on the file and the opposite end connected to the finger or arm 8 by means of a bolt and nut 11. As the handle is transferable and may be used on either end of the file, a hook or curved lug 12 is provided on the opposite side of the file from the hook 10, for the purpose of attaching the spring thereto when the handle is reversed.

In use, one end of the file is inserted between the lugs 7 and slid into the socket 6, and the spring is placed over the hook 10, when the file is ready for use.

I do not wish to be understood as limiting myself to the details of construction and arrangement as herein described and illustrated, as it is manifest that variations and modifications may be made in the features of construction and arrangement, in the adaptation of the device to various conditions of use, without departing from the spirit and scope of my invention. I therefore reserve the right to all such variations and modifications as properly fall within the scope of my invention and the terms of the following claims.

What is claimed is:—

1. A file or rasp having oppositely curved ends provided with abrading surfaces, and a removable handle adapted to be fitted over the abrading surface of either end.

2. A file or rasp having oppositely curved ends substantially S-shaped in general contour and having abrading surfaces on the opposite convex faces of said ends.

3. A file or rasp having oppositely curved ends substantially S-shaped in general contour and having abrading surfaces on the opposite convex faces of said ends, and a removable handle applied to either curved end over the abrading surface formed thereon.

4. A file or rasp having its ends formed smooth on one side and with an abrading surface on the other side, the abrading surfaces being on opposite sides of the file or rasp, and a removable handle applied to either end of the file or rasp over the abrading surface and means for holding the handle in place.

5. A file or rasp having its ends provided with opposite abrading surfaces, a handle applied to either end, and resilient means for securing said handle to said file or rasp.

6. A file or rasp having abrading surfaces on its ends, a handle having a socket to receive the end of the file and fitting over the abrading surface, and means for securing the handle to the file.

7. A file or rasp having abrading surfaces on its ends, a handle having a socket to receive the end of the file, lugs to embrace the file, a finger or arm, and resilient means for securing said handle to the file.

8. A file or rasp having curved ends provided with abrading surfaces, a handle longitudinally and laterally curved and having a socket to receive the end of the file and fitting over the abrading surface, and means for holding the handle in place.

9. A file or rasp having a substantially straight middle portion, and curved ends with opposite abrading surfaces, a removable handle adapted to be attached to either end of the file, and means for securing the handle to the file.

10. A file or rasp having a substantially straight middle portion and curved ends with opposite abrading surfaces, and a handle provided with a socket to receive the end of the file and fitting over the abrading surface, a finger or arm, and resilient means for securing said handle to the file.

11. A file or rasp having a substantially straight middle portion and curved ends with abrading surfaces, a handle provided with a socket to receive the end of the file and fitting over the abrading surface, a curved finger or arm, transversely extending lugs provided on the handle and engaging the file, hook-shaped lugs provided on opposite sides of the file or rasp, and a spring connecting one of the hook-shaped lugs to the handle.

In testimony, that I claim the foregoing as my own I have hereto affixed my signature in the presence of two witnesses.

JOHN AMBICKY.

Witnesses:
MAE RASMUSSEN,
STEPHEN F. SOMOGYI.

Copies of this patent may be obtained for five cents each, by addressing the "Commissioner of Patents, Washington, D. C."